(12) United States Patent
Imai

(10) Patent No.: US 6,302,148 B1
(45) Date of Patent: Oct. 16, 2001

(54) COUPLING DEVICE

(75) Inventor: Takashi Imai, Gyoda (JP)

(73) Assignee: Surpass Industry Co. Ltd., Gyoda (JP)

( * ) Notice: Subject to any disclaimer, the term of this patent is extended or adjusted under 35 U.S.C. 154(b) by 0 days.

(21) Appl. No.: 09/694,544

(22) Filed: Oct. 23, 2000

(30) Foreign Application Priority Data

Oct. 26, 1999 (JP) .................................................. 11-304606

(51) Int. Cl.$^7$ .................................................... F16L 37/28
(52) U.S. Cl. .................... 137/614.04; 137/209; 137/322; 137/564.5
(58) Field of Search .............................. 137/209, 614.04, 137/564.5, 322

(56) References Cited

U.S. PATENT DOCUMENTS

| | | | | |
|---|---|---|---|---|
| 3,228,413 | * | 1/1966 | Stevens, Jr. .......................... | 137/322 |
| 3,521,671 | * | 7/1970 | Handeland ......................... | 137/564.5 |
| 3,720,230 | * | 3/1973 | Miller et al. ....................... | 137/564.5 |
| 3,842,614 | * | 10/1974 | Karcher et al. ......................... | 62/56 |
| 4,510,969 | * | 4/1985 | Rodth .............................. | 137/614.05 |
| 4,709,725 | * | 12/1987 | Morrison ......................... | 137/614.04 |

FOREIGN PATENT DOCUMENTS

| | | | | |
|---|---|---|---|---|
| 103116 | * | 6/1998 | (DE) ..................................... | 137/322 |

\* cited by examiner

*Primary Examiner*—A. Michael Chambers
(74) *Attorney, Agent, or Firm*—Kolisch Hartwell Dickinson, McCormack & Heuser

(57) ABSTRACT

There is provided a plug 2 provided with a valve hole (main flow passage) and sub flow passages 17 and a socket 1, which is provided with a valve hole (main flow passage) and sub flow passages 46, and which is able to be fitted together with the plug 2 at an arbitrary angle of torsion, and which forms an annular flow passage 60 with the plug 2 when fitted together with the plug 2. When the plug 2 and socket 1 are fitted together, these valve holes communicate with each other, and the sub flow passages 17 and the sub flow passages 46 communicate with each other via the annular flow passage 60.

Namely, an improvement in work efficiency is achieved by the easy coupling of different types of liquid flow passages.

19 Claims, 6 Drawing Sheets

COUPLING DEVICE

BACKGROUND OF THE INVENTION

1. Field of the Invention

The present invention relates to a coupling device used when connecting a tube to a container containing liquid or the like.

2. Description of the Related Art

Conventionally, in order to take out the liquid that is stored inside a container, a gas (air or the like) is introduced inside the container and the liquid is forced outside the container by the pressure of the gas.

If the liquid is one that cannot be allowed to come into contact with a gas, an internal bag is placed inside the container and the liquid is kept sealed inside that bag. To take out the liquid, air is introduced to the outside of the internal bag thereby shrinking the bag with the resulting pressure and forcing out the liquid.

However, in the above examples, because it is necessary for a tube for extracting the liquid and a tube for introducing the gas to both be connected to the container, and for main flow passages and sub flow passages to be coupled, the work efficiency tends to deteriorate.

Accordingly, the aim of the present invention is to provide a coupling device that achieves an improvement in the work efficiency by allowing the simple coupling of different types of liquid flow passages.

SUMMARY OF THE INVENTION

The coupling device of the present invention enables simultaneous coupling using a single coupling device in order to couple together different liquid flow passages. Therefore, different device systems need to be unified in a single system.

However, as mentioned above, the coupling device of the present invention is also used when simultaneously coupling together flow passages of liquids that cannot be allowed to come into contact with air and air flow passages. As a result, a high degree of sealability is necessary.

Moreover, when unifying the device systems, a reduction in the size thereof is preferable as this leads to an increase in work efficiency.

When coupling one type of liquid flow passage, it is normally possible to perform the coupling without regard to directionality. However, if a plurality of liquid flow passages are coupled using a single coupling device, because each flow passage needs to be aligned, the problem arises that the sockets need to be matched to specific directions and then coupled.

According to the present invention, there is provided a coupling device for communicating flow passages with each other by connecting the flow passages to each other, comprising: a plug provided with a main flow passage and a sub flow passage; a socket, which is provided with a main flow passage and a sub flow passage, and which is able to be fitted together with the plug at an arbitrary angle of torsion, and which forms an annular flow passage with the plug when fitted together with the plug, wherein, when the plug and socket are fitted together, the main flow passage on the plug side and the main flow passage on the socket side communicate with each other, and the sub flow passage on the plug side and the sub flow passage on the socket side communicate with each other via the annular flow passage.

According to the present invention, because the sub flow passages communicate with each other via an annular flow passage, even when the socket and plug are coupled together at an arbitrary angle of torsion, each sub flow passage communicates with the annular flow passage. As a result, it is possible to couple each of the flow passages without considering the direction of the plug or socket.

DESCRIPTION OF THE PREFERRED EMBODIMENTS

Next, the coupling device of the present invention will be described with reference made to the drawings.

Figure 1:
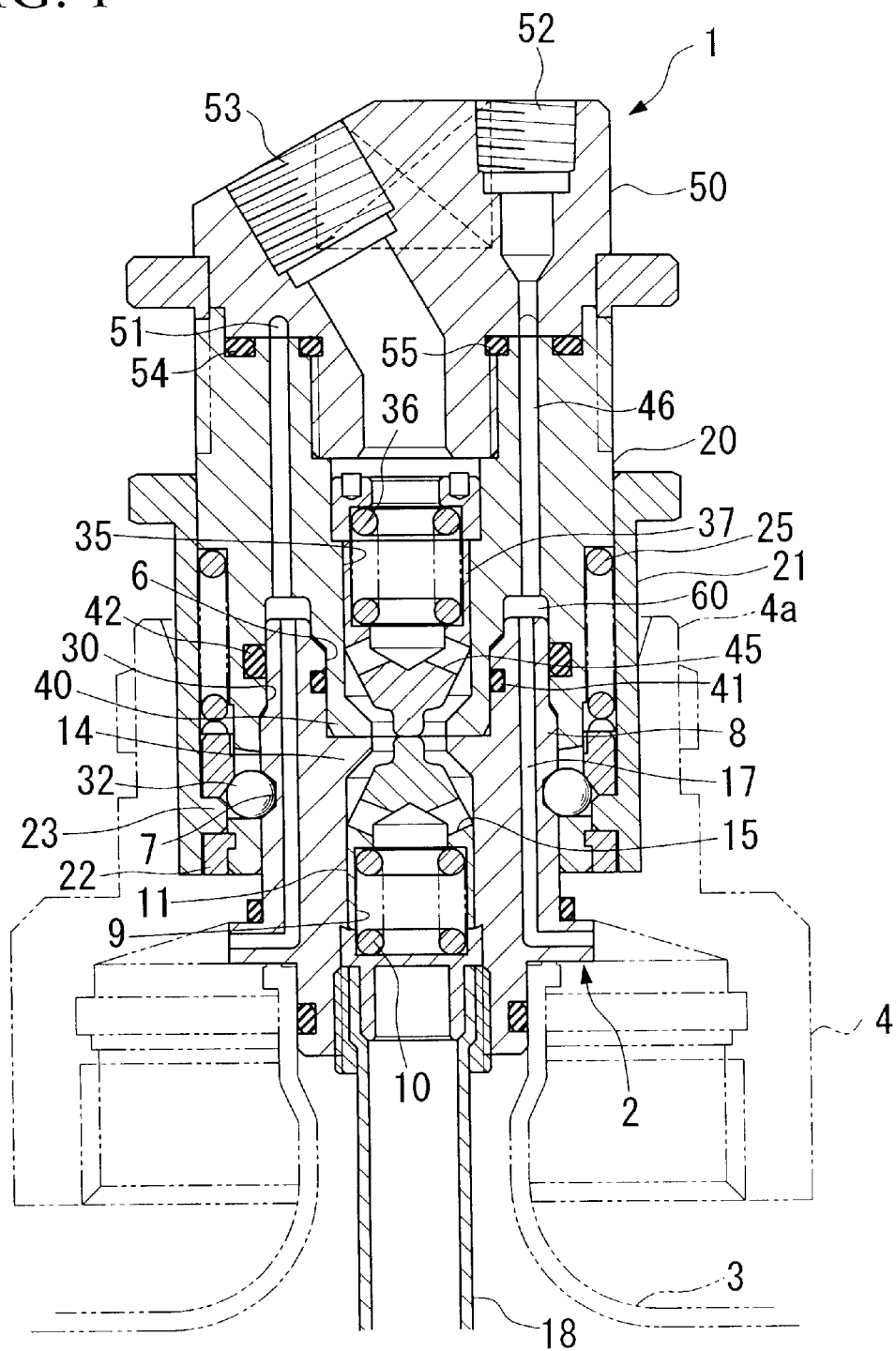
FIG. 1 is a cross-sectional view of the coupling device of the present invention showing the plug and socket coupled together.

As is shown in FIG. 1, the coupling device comprises a socket 1 and a plug 2.

Figure 4:
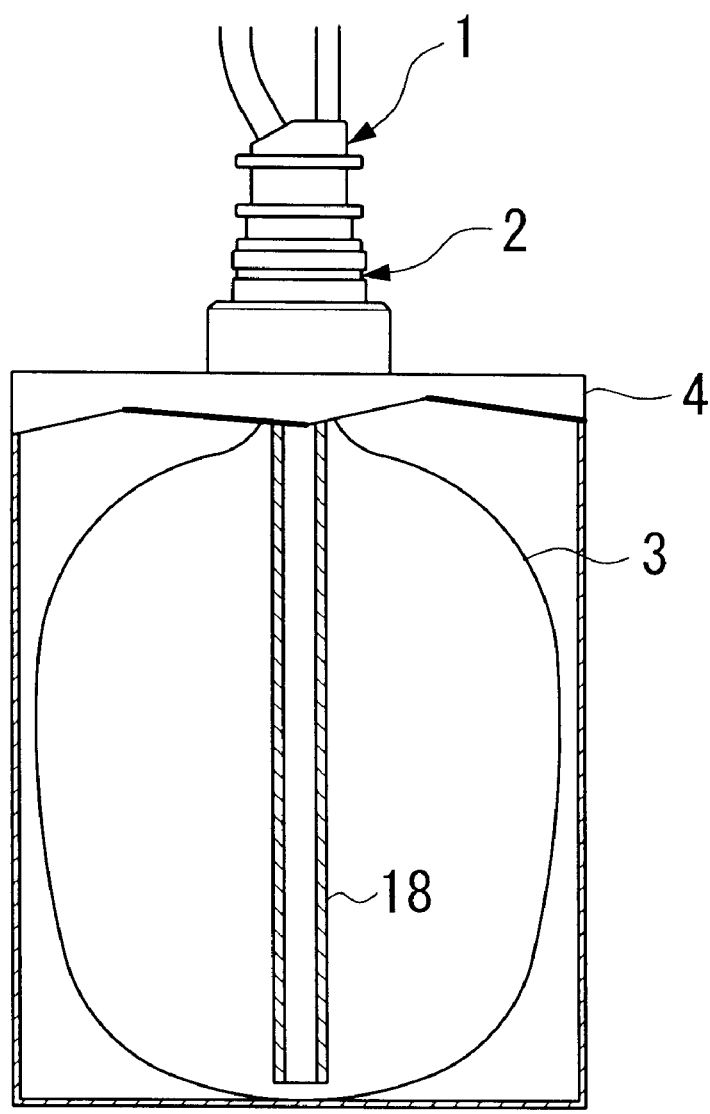
FIG. 4 shows the coupling device of the present invention placed inside a container.

As is shown in FIG. 4, the plug 2 is attached to a container 4 inside which is provided an inner bag 3.

Figure 2:
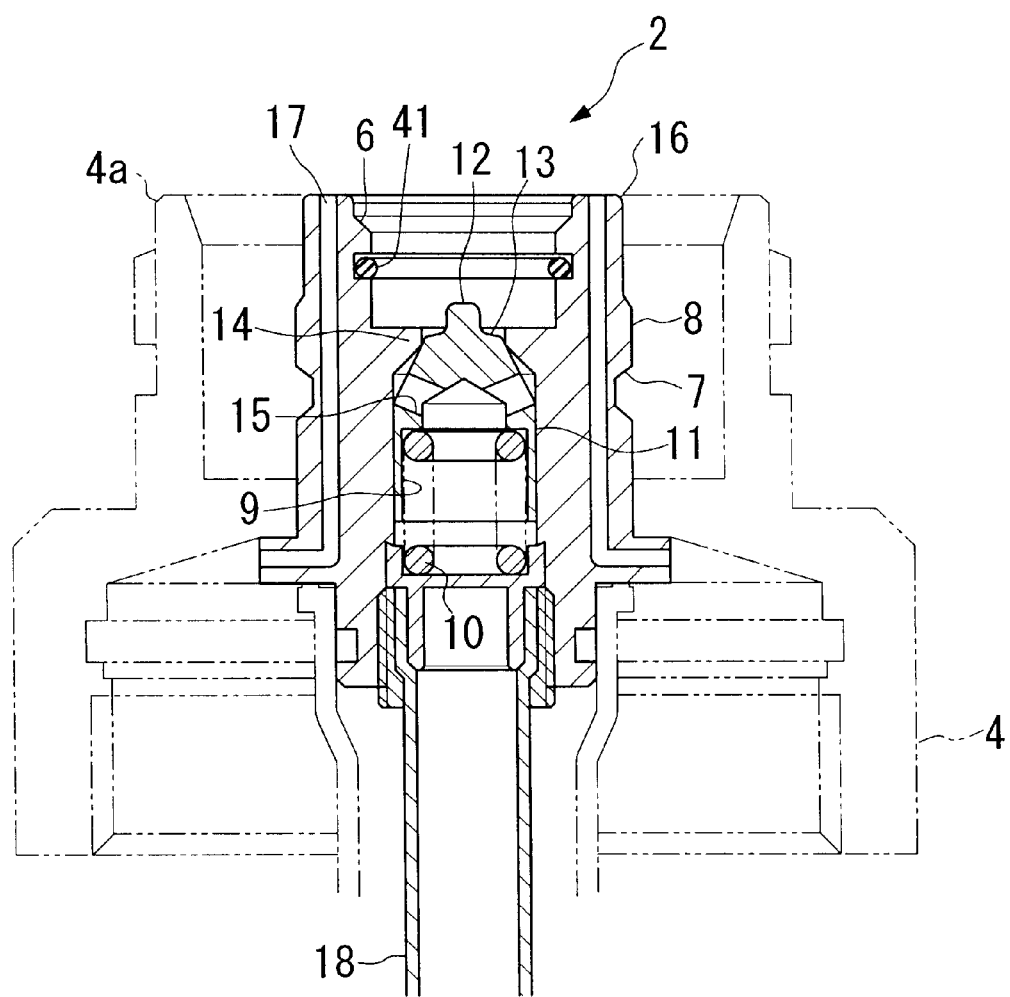
FIG. 2 is a cross-sectional view of the plug of the coupling device of the present invention.

As is shown in FIG. 2, a socket hole 6, into which is fitted a valve seat portion 40 of a socket portion 20 described below, is provided in the distal end side (the upper side in the diagram) of the plug 2. The peripheral wall of the socket hole 6 forms an annular wall portion 16.

A groove 7 is provided in the peripheral wall of the plug 2 running in the peripheral direction thereof. The groove 7 is formed by reducing the diameter of the peripheral wall of the socket 2. A bulging portion 8 formed by expanding the diameter of the peripheral wall of the socket 2 is provided in the peripheral wall on the distal end side of the groove 7.

A valve hole (main flow passage) 9 that communicates with the socket hole 6 is provided running in the axial direction in the center of the plug 2. A valve 11 urged in the distal end direction by a valve spring 10 is provided so as to be able to slide within the valve hole 9.

A protruding portion 12 is provided at the distal end of the valve 11. A shoulder portion 13 surrounding the protruding portion 12 is urged so as to be placed in close contact with the valve seat portion 14 provided in the plug 2. The protruding portion 12 protrudes towards the distal end side beyond the valve seat portion 14.

A valve internal flow passage 15, which connects the distal end side of the valve 11 with the proximal end side thereof, is provided in the valve 11.

Moreover, a plurality of sub flow passages 17 are provided running in the axial direction in the plug 2 surrounding the valve hole 9, with a gap between each sub flow passage 17 in the peripheral direction. One end of the sub flow passages 17 opens onto the distal end of the annular wall portion 16 of the socket hole 6, while the other end of the sub flow passages 17 bends inside the container 4 in a radial direction towards the outside, and is communicated with the outer side of the inner bag 3. The valve hole 9 is also communicated with an intake pipe 18 inside the inner bag 3.

A guide wall 4a is also provided in the container 4 surrounding the plug 2. An O ring (i.e. a sealing member) 41 for sealing the gap between the inner wall of the socket hole 6 and the socket portion 20 described below is provided in the inner wall of the socket hole 6.

The socket 1 will now be described with reference to FIG. 3.

The socket 1 is provided with a socket portion 20.

A stopper ring 22 that is fixed so as to protrude towards the outside in the radial direction is provided at the distal end (i.e. at the bottom side of the drawing in FIG. 3) of the socket portion 20. A sleeve 21 is externally fitted onto the outside of the socket portion 20 in a state in which it is prevented from coming off by the stopper ring 22. A protruding portion 23 protruding towards the inside in the radial direction is formed in the distal end of the sleeve 21. The sleeve 21 is prevented from coming off by the protruding portion 23 engaging with the stopper ring 22.

A gap is formed between the sleeve 21 and the socket portion 20. A sleeve spring 25 for urging a ring 24 and, via the ring 24, the protruding portion 23 towards the stopper ring 22 is provided in this gap.

Note that tapered surfaces 23a and 23b are formed in the distal end side (towards the bottom of the drawing) and in the proximal end side (towards the top of the drawing) respectively of the protruding portion 23 on the inner side in the radial direction thereof, while a tapered surface 24a is formed in the distal end side of the ring 24 on the inner side in the radial direction thereof.

A plug hole 30 that fits together with the annular wall portion 16 of the aforementioned plug 2 (i.e. a hole for the annular wall portion) is provided in the distal end portion of the socket portion 20.

A plurality of substantially elliptical holes 31 whose longitudinal direction runs in the axial direction of the socket portion 20 are formed in the peripheral direction of the wall portion of the plug hole 30. Balls 32 having a size which does not allow them to pass through to the outside of the holes 31 are provided for each hole 31 (i.e. as anchoring means).

Because the tapered surfaces 23b and 24a are formed on the protruding portion 23 and the ring 24 respectively, as described above, a pit is formed between the protruding portion 23 and the ring 24, as is shown in the drawings. In the state shown in the drawings, the balls 32 are positioned so as to be engaged with this pit.

A valve hole 35 (the main flow passage) that communicates with the plug hole 30 is provided in the axial direction in the center of the socket portion 20. A valve 37 that is urged in the direction of the distal end by a spring 36 is provided so as to be to slide inside the valve hole 35.

A protruding portion 38 is provided at the distal end of the valve 37. A shoulder portion 39 that surrounds the protruding portion 38 is urged so as to fit tightly into a valve seat portion 40 provided in the socket portion 20. The protruding portion 38 protrudes towards the distal end side beyond the valve seat portion 40.

Note that the valve seat portion 40 bulges from the bottom wall of the plug hole 30, namely, from the proximal end side of the socket 1 towards the distal end side of the socket 1. In addition, an O ring (i.e. a sealing member) 42 for sealing the gap between the side wall of the plug hole 30 and the plug 2 which fits into the plug hole 30 is provided in the side wall of the plug hole 30.

A valve internal flow passage 45 which communicates the periphery of the distal end portion of the valve 37 with the proximal end side thereof is provided in the valve 37. Liquid flowing from the distal end of the valve hole 35 travels along the valve internal flow passage 45 and comes out at the proximal end side of the valve hole 35.

Moreover, a plurality of sub flow passages 46 are provided running in the axial direction in the socket section 20 surrounding the valve hole 35, with a gap between each sub flow passage 46 in the peripheral direction. One end of the sub flow passages 46 opens onto the proximal end side of the socket portion 20, while the other end is connected to the plug hole 30.

A process head 50 is screwed into the proximal end side of the socket portion 20. An annular flow passage 51 that connects each of the sub flow passages 46 is provided on the face of the process head 50 that abuts against the socket portion 20.

There are also provided a sub flow passage aperture portion 52 for connecting the annular flow passage 51 with the outside and a main flow passage aperture portion 53 for connecting the valve hole 35 with the outside. Screw threads for connecting tubes (see FIG. 4) are formed in the inner walls of each of the sub flow passage aperture portion 52 and the main flow passage aperture portion 53.

The sub flow passage aperture portion 52 is provided running in the axial direction, however, the main flow passage aperture portion 53 is formed with a bend so as to separate from the sub flow passage aperture portion 52.

In addition, an O ring 54 encircling the annular flow passage 51 and an O ring 55 placed between the annular flow passage 51 and the valve hole 35 are provided at the abutting faces of the socket portion and the process head 50.

FIG. 1 shows the above described plug and socket connected together.

When connected together, the socket 1 is inserted into the socket hole 6 on the plug 2 side. In addition, the annular wall portion 16 of the plug 2 is inserted into the plug hole 30 on the socket 1 side.

Moreover, the valve seat portion 14 of the plug 2 side and the valve seat portion 40 of the socket 1 side abut against each other. In addition, each of the valves 11 and 37 is pressed by the distal end 38 and 12 respectively of the other valve so as to move away from their own respective valve seat portions 14 and 40 against the urging force of the respective springs 10 and 36. As a result, the two valve internal flow passages 15 and 45 communicate with each other.

The distal ends of the sub flow passages 46 on the socket 1 side and the distal end of the sub flow passages 17 on the plug 2 side face each other with a gap in between. This gap forms an annular flow passage 60 and the sub flow passages 46 on the socket 1 side and the sub flow passages 17 on the plug 2 side communicate with each other via this annular flow passage 60.

The balls 32 are engaged in the groove 7 in the peripheral wall of the plug 2.

The method of joining and separating the plug 2 and the socket 1 will now be described.

Figure 5A:
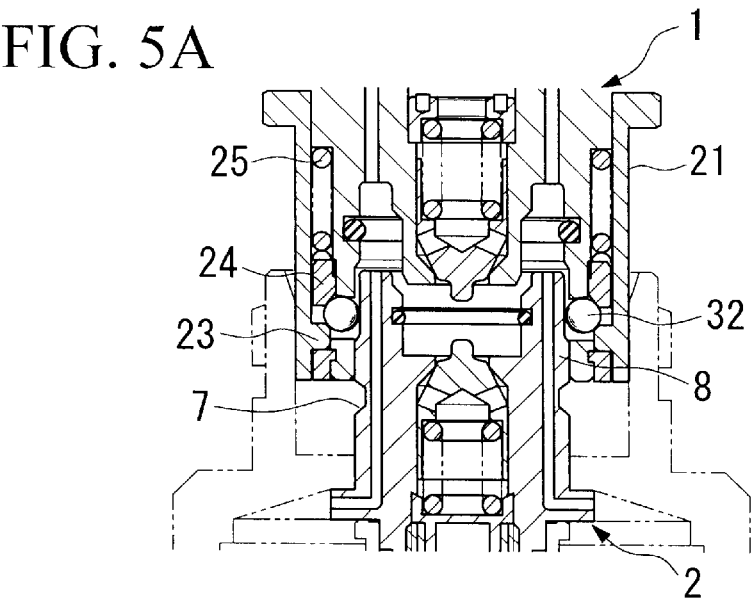
FIG. 5 shows simplified views showing the operation when coupling the coupling device of the present invention.

Firstly, as is shown in FIG. 5A, the plug 2 is inserted into the distal end of the socket 1.

Figure 5B:
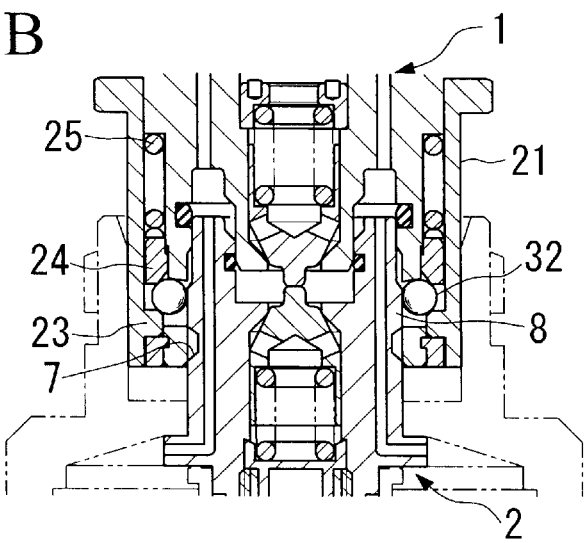

When the plug 2 is inserted further, then, as is shown in FIG. 5B, the bulging portion 8 pushes the balls 32 towards the outer side in the radial direction. At this time, the balls 32 push the ring 24 upward against the urging force of the sleeve spring 25, allowing the balls 32 to enter into the gap thus created between the ring 24 and the protruding portion 23. As a result, the plug 2 is able to be inserted even further.

Figure 5C:
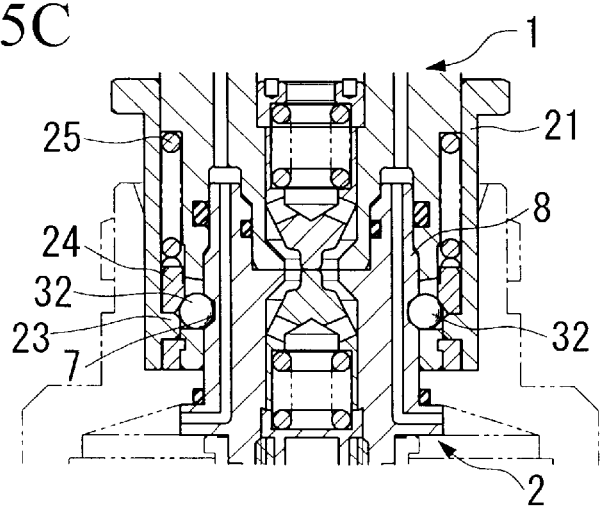

When the insertion is continued, as is shown in FIG. 5C, the balls 32 are fitted into the groove 7, and the ring 24 and the protruding portion 23 abut against each other with the sleeve spring 25 pressing against the ring 24. The insertion is completed at this point.

Because the balls 32 are fitted into the groove 7 in this state, even if an attempt is made to pull out the socket 1, or if a liquid is introduced at high pressure, the socket 1 is prevented from coming free by the balls 32.

Figure 6:
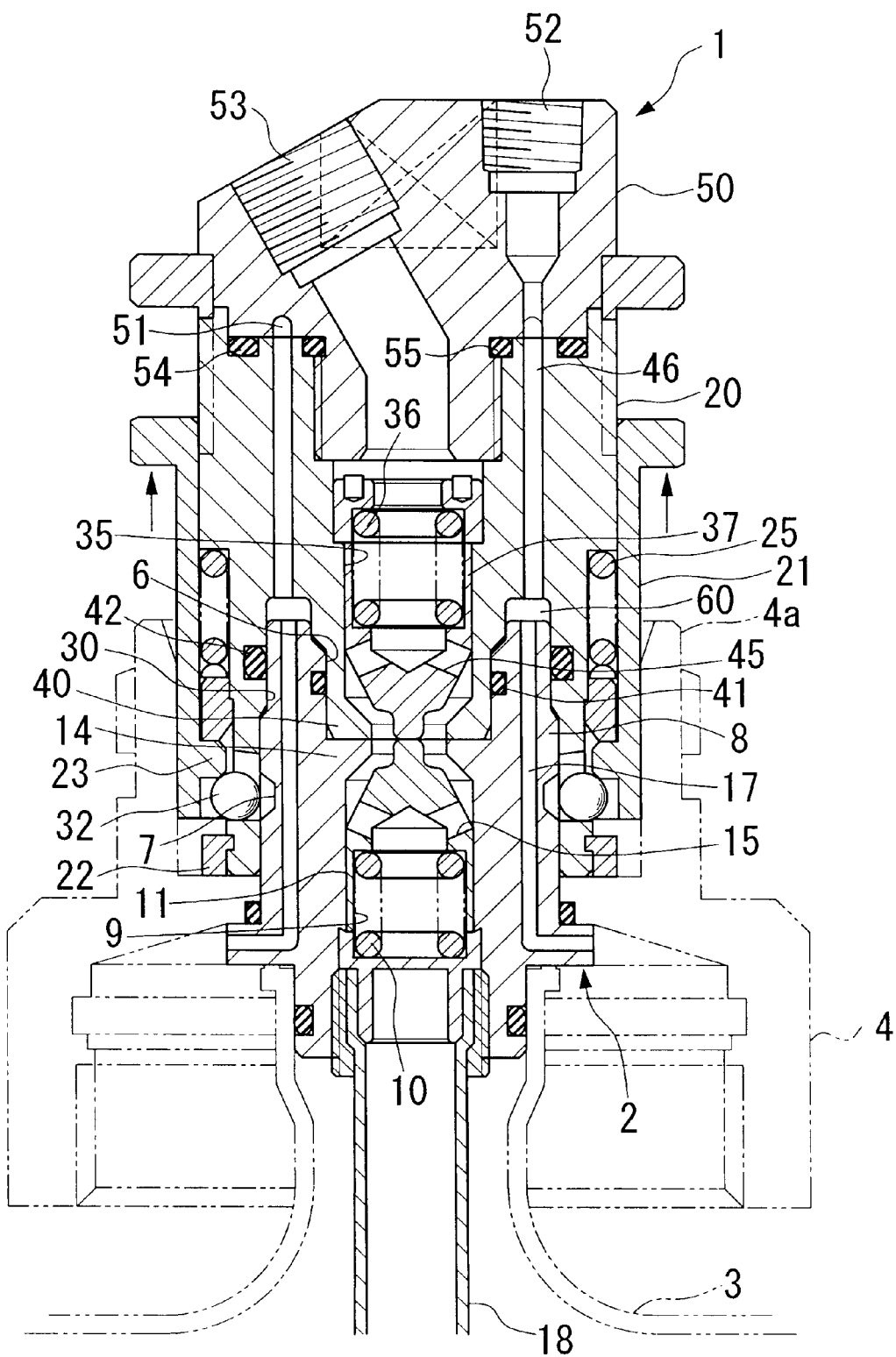
FIG. 6 is a view showing the socket being removed from the plug in the coupling device of the present invention.

When removing the socket 1, the sleeve 21 is lifted up, as is shown in FIG. 6. The protruding portion 23 is lifted up by the lifting up of the sleeve 21. As a result, a gap is created between the protruding portion 23 and the stopper ring 22. Because the balls 32 are able to move into this gap, the balls 32 are freed from the groove 7 and the lock between the plug 2 and the socket 1 is released, thereby allowing the socket 1 to be taken out.

As described above, because it is possible to fit the socket 1 and the plug 2 together at an optional angle of torsion, there is no need for alignment and the coupling is simplified.

Moreover, as is shown in FIG. 5, it is possible to complete the coupling simply by performing the insertion, and there is no need for fastening to be achieved by a separate clamp or the like. Moreover, as is shown in FIG. 6, it is possible to remove the socket 1 easily by simply lifting up the sleeve 21.

Furthermore, as is shown in FIG. 2, there is provided an annular wall portion 16. Because the leakage length is made longer by the unevenness in the annular wall portion 16, the seal performance is improved. Moreover, as is shown in FIG. 1, the side faces of the socket 1 and the plug 2 are sealed by the O rings 41 and 42. Accordingly, there is practically no variation of the socket 1 in the radial direction relative to the plug 2. As a result, it is possible to obtain a stable sealing performance.

A plurality of both the sub flow passages 46 and the sub flow passages 17 are provided. Introduced gas that is introduced via the sub flow passage aperture portion 52 is distributed to the sub flow passages 46 and 17 by the two annular flow passages 51 (FIG. 3) and 60 (FIG. 1), and can be sent out uniformly in directions radiating out from the outlet on the container side of the sub flow passage 17. As a result, it is possible to supply gas uniformly to the inside of the container, and by having the outlet on the container side open towards the outer side in the radial direction, there is no blocking off of the outlet on the container side by the bag body 3.

By forming the main flow passage aperture portion 53 in the process head 50 with a bend so that it separates from the sub flow passage aperture portion 52, it is possible to place both the main flow passage aperture portion 53 and the sub flow passage aperture portion 52 in what is a limited space.

Moreover, because there are valves, 11 and 37, provided for both the socket 1 and the plug 2, and the valve internal flow passages 15 and 45 are communicated together only when the socket 1 and the plug 2 are coupled, it is possible to achieve a seal through the valves 11 and 37 when the socket 1 and valve 2 are not coupled.

Figure 3:
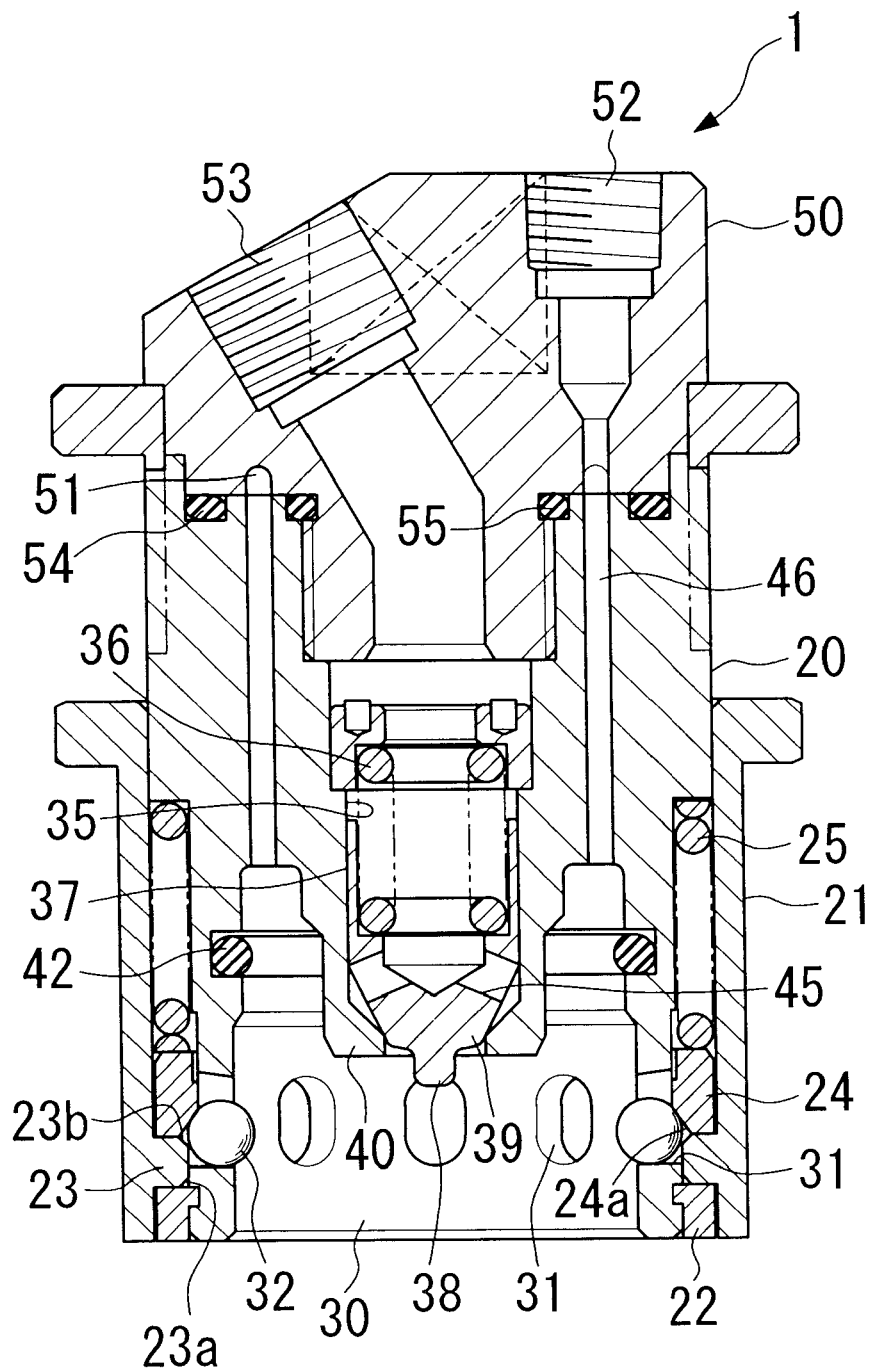
FIG. 3 is a cross-sectional view of the socket of the coupling device of the present invention.

Note that, as can be understood by comparing FIGS. 2 and 3, there is a difference in that there are fewer drive portions in the construction of the plug 2, which is more difficult to replace, than in the socket 1, giving the plug 2 a simpler structure.

As has been described above, in the present invention, because it is possible to connect sub flow passages via an annular flow passage, it is possible to couple together a plurality of liquid flow passages simultaneously and without regard to the direction thereof.

Moreover, as is shown in FIG. 5C, it is possible to prevent the socket from coming free using an anchoring means such as the balls 32 fitting into the groove 7. By employing this type of structure, there is no need, for example, to fix the socket and plug together using another fixing means (such as a clamp or the like) after the socket and plug have been coupled, and the coupling is completed simply by fitting the socket together with the plug.

Note that, when removing the socket from the plug, the anchoring of the anchoring means only needs to be released. As a result, the socket can be more easily removed and the work efficiency improved.

Moreover, by providing an annular wall portion surrounding the main flow passage aperture portion in either one of the plug or socket, and forming a hole into which the annular wall portion fits in the other one of the plug or socket, the leakage length is made longer by the unevenness of the annular wall portion, thereby improving the sealing performance. Further, it is possible to obtain a stable sealing performance by providing sealing members such as O rings or the like in the side faces.

Still further, by providing a plurality of the sub flow passages surrounding the main flow passage, it is possible to increase the total surface area of the sub flow passages without increasing the size of the coupling device, and to supply gas uniformly to the inside of the container.

Moreover, by placing the main flow passage aperture portion and the sub flow passage aperture portion further apart than the distance between the main flow passage and the sub flow passages, it is possible to guarantee sufficient connection space for connecting the tube to the socket (see FIG. 4).

What is claimed is:

1. A coupling device for communicating flow passages with each other by connecting the flow passages to each other, comprising:
    a plug provided with a main flow passage and a sub flow passage;
    a socket, which is provided with a main flow passage and a sub flow passage, and which is able to be fitted together with the plug at an arbitrary angle of torsion, and which forms an annular flow passage with the plug when fitted together with the plug, wherein,
        when the plug and socket are fitted together, the main flow passage on the plug side and the main flow passage on the socket side communicate with each other, and the sub flow passage on the plug side and the sub flow passage on the socket side communicate with each other via the annular flow passage; and
        the main flow passage is provided in the central portion of the plug and a plurality of the sub flow passages are provided surrounding the main flow passage.

2. The coupling device according to claim 1, further provided with anchoring means for preventing the socket from being removed by anchoring the socket in the plug through the insertion of the socket in the plug.

3. The coupling device according to claim 2, wherein an annular wall portion surrounding the main flow passage of one of the plug or the socket is provided for that main flow passage, and an annular wall portion hole into which the annular wall portion is fitted is provided in the other of the plug or the socket.

4. The coupling device according to claim 3, wherein the anchoring means is provided with: a groove formed running in a peripheral direction on an outer peripheral surface of the annular wall portion; holes formed in the annular wall portion hole and spaced at intervals in a peripheral direction; balls placed in the holes and capable of protruding towards the inner surface side of the annular portion hole; and a ring that is placed on the rear surface of the hole, and engages the balls with the groove by causing the balls to protrude from the holes towards the inner surface side of the annular portion hole when the balls are placed in the groove through the insertion of the socket in the plug and the consequent pushing of the annular wall portion into the annular wall portion hole so that they become engaged, resulting in the state of connection between the socket and the plug being maintained.

5. The coupling device according to claim 4, wherein a sleeve is provided on the outer peripheral side of the annular wall portion for moving the ring to a position removed from the rear surface of the hole by sliding in the axial direction, and releasing the state in which the ball is engaged in the groove by enabling the ball that is protruding towards the inner surface side of the annular wall portion hole to be caught in the hole.

6. The coupling device according to claim 3, wherein the annular wall portion is formed in the plug, and the annular wall portion hole is formed in the socket.

7. The coupling device according to claim 6, wherein the anchoring means is provided with: a groove formed running in a peripheral direction on an outer peripheral surface of the annular wall portion; holes formed in the annular wall portion hole and spaced at intervals in a peripheral direction; balls placed in the holes and capable of protruding towards the inner surface side of the annular portion hole; and a ring that is placed on the rear surface of the hole, and engages the balls with the groove by causing the balls to protrude from the holes towards the inner surface side of the annular portion hole when the balls are placed in the groove through the insertion of the socket in the plug and the consequent pushing of the annular wall portion into the annular wall portion hole so that they become engaged, resulting in the state of connection between the socket and the plug being maintained.

8. The coupling device according to claim 7, wherein a sleeve is provided on the outer peripheral side of the annular wall portion for moving the ring to a position removed from the rear surface of the hole by sliding in the axial direction, and releasing the state in which the ball is engaged in the groove by enabling the ball that is protruding towards the inner surface side of the annular wall portion hole to be caught in the hole.

9. The coupling device according to claim 3, wherein an O ring is provided between the wall surface on the outer peripheral side of the annular wall portion and the wall surface on the outer peripheral side of the annular wall portion hole.

10. The coupling device according to claim 9, wherein an O ring is provided between the wall surface on the inner peripheral side of the annular wall portion and the wall surface on the inner peripheral side of the annular wall portion hole.

11. The coupling device according to claim 3, wherein an O ring is provided between the wall surface on the inner peripheral side of the annular wall portion and the wall surface on the inner peripheral side of the annular wall portion hole.

12. The coupling device according to claim 1, wherein a main flow passage aperture portion that communicates with the main flow passage of the socket and a sub flow passage aperture portion that communicates with the sub flow passages of the socket are provided in the socket, and the main flow passage aperture portion and the sub flow passage aperture portion are placed further apart from each other than are the main flow passage and the sub flow passages, and a tube is connected to each of the main flow passage aperture portion and the sub flow passage aperture portion in an attachable and removable manner.

13. The coupling device according to claim 12, wherein the main flow passage aperture portion and the sub flow passage aperture portion are formed in different surfaces.

14. The coupling device according to claim 1, wherein a valve for opening a flow passage when the plug and the socket are connected together is provided in the main flow passage of the plug and the main flow passage of the socket.

15. The coupling device according to claim 14, wherein springs are provided for urging the valves in the direction of the end portions so as to thereby maintain a state in which the flow passages are blocked by the valves abutting against the edge portions of the main flow passage apertures, and when the plug and the socket are connected together, the valves abut against each other and are moved away from the edge portions of the main flow passage apertures against the urging force of the springs, thereby opening the flow passages.

16. The coupling device according to claim 15, wherein protruding portions are formed on end surfaces of the valves.

17. A coupling device for communicating flow passages with each other by connecting the flow passages to each other, comprising:

a plug provided with a main flow passage and a sub flow passage;

an internal bag and a container that houses the internal bag and to which the plug is fixed; and a socket, which is provided with a main flow passage and a sub flow passage, and which is able to be fitted together with the plug at an arbitrary angle of torsion, and which forms an annular flow passage with the plug when fitted together with the plug, wherein, when the plug and socket are fitted together, the main flow passage on the plug side and the main flow passage on the socket side communicate with each other, and the sub flow passage on the plug side and the sub flow passage on the socket side communicate with each other via the annular flow passage; and the main flow passage on the plug side communicates with the inside of the internal bag and the sub flow passages on the plug side communicate with the outside of the internal bag and the inside of the inside of the container.

18. The coupling device according to claim 17, wherein a connecting pipe extending to the inside of the internal bag is connected to the main flow passage of the plug.

19. The coupling device according to claim 18, wherein, in the container, liquid is stored in the internal bag and gas is fed from the sub flow passages of the plug to the outside of the internal bag, and liquid inside the internal bag is forced from the main flow passage via the connecting pipe.

* * * * *